(12) United States Patent
Montague

(10) Patent No.: US 6,642,844 B2
(45) Date of Patent: Nov. 4, 2003

(54) DIRECT DISPATCHERLESS AUTOMATIC VEHICLE-TO-VEHICLE AND NON-VEHICLE TO VEHICLE POLICE/EMERGENCY MEDICAL SERVICE NOTIFICATION SYSTEM FOR LIFE THREATENING ACCIDENTS, HIJACKINGS, THEFTS AND MEDICAL EMERGENCIES

(76) Inventor: Albert Montague, 72 Poplar Ave., Deal, NJ (US) 07723

( * ) Notice: Subject to any disclaimer, the term of this patent is extended or adjusted under 35 U.S.C. 154(b) by 32 days.

(21) Appl. No.: 09/934,821

(22) Filed: Aug. 22, 2001

(65) Prior Publication Data

US 2002/0026266 A1 Feb. 28, 2002

Related U.S. Application Data

(60) Provisional application No. 60/226,949, filed on Aug. 22, 2000.

(51) Int. Cl.[7] ................................................ G08B 25/00
(52) U.S. Cl. ............. 340/524; 340/825.36; 340/825.49; 340/286.02; 340/293; 340/991; 701/36; 701/301
(58) Field of Search .................. 340/502, 524, 340/825.36, 825.49, 7.22, 7.5, 286.02, 286.06, 293, 313, 991; 235/384; 342/357.07, 457; 701/36, 301

(56) References Cited

U.S. PATENT DOCUMENTS

| | | | | |
|---|---|---|---|---|
| 5,223,844 A | * | 6/1993 | Mansell et al. ............. 342/357 |
| 5,515,285 A | * | 5/1996 | Garrett et al. ........... 340/990 X |
| 5,892,442 A | * | 4/1999 | Ozery ......................... 340/539 |
| 5,945,919 A | * | 8/1999 | Trask .................... 340/825.49 |
| 6,166,627 A | * | 12/2000 | Reeley ........................ 340/426 |
| 6,166,656 A | * | 12/2000 | Okada et al. ................ 340/901 |
| 6,496,770 B2 | * | 12/2002 | Winner et al. ................. 701/96 |

* cited by examiner

Primary Examiner—Daryl Pope
(74) Attorney, Agent, or Firm—Ezra Sutton

(57) ABSTRACT

A time-critical automatic, instantaneous and direct (dispatcherless) vehicle to vehicle, auto-routing Police/Emergency Medical Service vehicle, notification and response system that provides interactive and direct communication between a vehicle, non-vehicle, e.g. parked aircraft, property or individual in need of immediate emergency assistance, and the nearest (primary) mobile P/EMS vehicle that is available to respond to the exigency. Rapid notification and response is achieved by using a conventional Global Positioning System (GPS), a cellular phone optionally having positioning capability for transmitting the emergency signal, and a vehicle fleet management system (FMS). The latter is modified and designed to operate with a flawless vehicle theft and/or accident characterization technology. The central processing unit processes data from the GPS/FMS automatically and routes a distress call to a secondary or tertiary P/EMS vehicle, i.e., the next closes P/EMS emergency response vehicle(s), if the primary (nearest) P/EMS does not acknowledge receipt of the request for immediate assistance and intent to respond within a predetermined period. Optionally, a time-critical, life and property threatening multi-channel emergency number 767 (SOS) is presented to differentiate between the well known and often used 911 police emergency number.

23 Claims, 2 Drawing Sheets

DIRECT DISPATCHERLESS AUTOMATIC VEHICLE-TO-VEHICLE AND NON-VEHICLE TO VEHICLE POLICE/EMERGENCY MEDICAL SERVICE NOTIFICATION SYSTEM FOR LIFE THREATENING ACCIDENTS, HIJACKINGS, THEFTS AND MEDICAL EMERGENCIES

RELATED APPLICATION

This application is based on provisional application Ser. No. 60/226,949 filed on Aug. 22, 2000.

FIELD OF THE INVENTION

The present invention relates to a direct, dispatcherless, automatic-routing, vehicle-to-vehicle (VTV) and non-vehicular to vehicle (NTV) Police/Emergency Medical Services (P/EMS) system that provides the user with the shortest notification and response time that is technologically possible to saves lives and protect property, whenever vehicular and human emergencies arise. VTV communication is accomplished by using a conventional Global Positioning System (GPS), which is coupled to a Fleet Management System (FMS) that can automatically locate and communicate directly (to avoid critical time delays when using an organizational dispatcher) with a P/EMS vehicle (cruiser) nearest to the vehicle in need of emergency assistance. NTV communications, however, in certain circumstances can forego the need for GPS capability, e.g., when the emergency and appeal for assistance is from a fixed location, a dwelling. Direct VTV communication hinges on the use of a modified GPS/FMS that uses essentially flawless theft and accident characterization technology, to eliminate erroneous emergency assistance calls to P/EMS cruisers. An important point should be understood in advancing this novel emergency notification approach. Only P/EMS emergency vehicles have respectively, the legal and social responsibility, obligation and means to respond to bonafide life threatening time-critical exigencies. Further, their ability to respond hinges on their being apprized of the exigency in a timely manner. A new multi-channel emergency number 767 (SOS) is optionally designated for this novel approach.

STATE OF THE ART

Vehicular accidents with their attendant injuries, losses of life and vehicular thefts as well as other non-vehicular social exigencies have an enormous social economic cost, currently estimated to be in the tens of billions of dollars each year. It is also common knowledge that many of these accidents, sustained injuries and other medical emergencies could be less severe, with many lives saved and not lost, if the emergency medical assistance sought arrived in a timely manner; in some instances just seconds earlier. In addition, property losses resulting from vehicular and non-vehicular thefts would also be substantially less, if requests for emergency assistance to the nearest available police cruiser are instantaneous, and the response equally prompt. There is no doubt that requests for life threatening emergency assistance and subsequent response by appropriate emergency assistance organizations should be sooner rather than later.

U.S. Pat. No. 6,166,656 to Okada, et al. ("Okada"), the disclosure of which is incorporated herein by reference, notes with regard to current external transmissions and communication of an accident that "Probable prescribed addresses may include a district police station or fire station for notifying the occurrence of accident, and a rescue association if there is any damage to the vehicle." Further, that "In many automobile accidents, life is in danger even while the emergency is being reported." Okada's recommended solution in part is, "to ask for help from nearby persons by publicly announcing the occurrence of an accident as soon as possible, or to apply first-aid treatment to prolong life until the rescue squad arrives." Okada, in this regard discloses, "An emergency assistance system for summoning first-aid assistance of persons and vehicles within the vicinity of a person involved in an automobile accident, while also making an emergency call to rescue and police authorities." Okada also claims and provides for "estimating position of a vehicle," "accident detection means . . . ," and "external communication means for notifying an emergency response organization of accident related information."

The aforementioned solution for vehicular emergencies fails to recognize that accidents often occur in remote regions where there are no persons or vehicles to witness, hear, or see the various alarms or receive local transmission signals generated by the suggested "small broadcasting equipment." Even if nearby people were apprized of an accident they would not, with certainty, be qualified to administer first aid. Further, the possibility of being sued by the injured party for aggravating the persons' injury could preclude direct intervention by any third party that may arrive first at the accident scene. Finally, calling an emergency "organization" for assistance consumes precious time. The following scenario or steps are generally followed to secure emergency assistance from an emergency "organization." First, a phone must be secured. This would be followed by an individual placing an emergency call to 911, then having to wait until a connection is established since 911 a well known emergency number may be busy. A verbal telephone link must then be established with a dispatcher, but now another delay may be encountered because the dispatcher is on another emergency call. Finally, when the dispatcher comes on line, information must then be conveyed about the accident, its location and other particulars. The dispatcher must then locate the nearest and available P/EMS and dispatch that vehicle(s) to the accident scene. This time consuming process wastes critical seconds, possibly minutes, as it runs through the aforementioned notification process, while a injured person(s) is (are) in need of immediate and proper medical attention. While many non-vehicular medical emergencies and thefts may forego the need to secure a wire or wireless telecommunications unit or system, e.g., phone or cell phone, the same aforementioned delays would be encountered when communicating with an organizational dispatcher. Time delays, even seconds, are critical when an injured person(s) is (are) in trauma and in urgent need of specialized and immediate medical attention.

SUMMARY AND OBJECTS OF THE INVENTION

The present invention overcomes the limitations of the prior art by providing an automated, real-time (instantaneous), vehicle-to-vehicle (VTV), wireless, direct (dispatcher less) notification and response system that optionally, but preferably, contacts a dedicated emergency number 767 (SOS), with multi-channel capability that automatically routes the emergency request, i.e., accident or theft, whichever is appropriate to the nearest P/EMS vehicle(s). The ability to communicate directly with a P/EMS vehicle(s) hinges on the use of essentially flawless accident and theft characterization technology. This approach eliminates the need for a dispatcher and the associated life threatening time delays when processing information, while providing exacting means to respond to the exigency in the shortest time frame that is technologically possible. It will also substantially reduce the notification time for the P/EMS vehicle(s) to be apprized of the exigency. This cost-effective approach will maximize the probability of saving lives, since seconds count when an injured person(s) is (are) experiencing possible trauma.

Similarly, real-time (instantaneous) notification of an on-going vehicle/aircraft (avionics) theft directly from the vehicle or parked aircraft being violated to the nearest police cruiser with an equally timely response by the cruiser could result in the apprehension of the would-be-thief in the act of committing the crime and prevention of the property from ever being moved from the location.

Further, the present invention also overcomes the limitations presented in prior art for NTV communications by providing an automated or semi-automated, real-time (instantaneous), wireless or semi-wireless, direct (dispatcher less) notification and response system that optionally, but preferably, contacts a dedicated emergency number 767 (SOS) with sub-channel capability. This methodology automatically routes the emergency request, whether it is an accident, theft or individual medical emergency, whichever is appropriate to the nearest P/EMS vehicle(s). A semi-automated request would occur when an individual with a predisposed medical condition in need of immediate emergency medical assistance manually triggers the request by activating a hand operated pager that one has at all times on his/her person, or, alternately uses a fully automated triage sensing/communication apparatus when indoors, outdoors or in transit.

The 767 number once established (connected) would be followed by other preselected digits to accurately convey the nature of the exigency and automatically route the appeal for assistance to the correct emergency response unit. For example 767 followed by the number 2 would represent a vehicular (Accident). While 767 followed by 4, would represent a medical emergency appeal from an (Individual) and when followed by the number 8 a (Theft). The aforementioned numbers correspond to the letter and numbers on a telephone pad, i.e., 2=Accident vehicular, 4=Individual medical emergency, 8=Theft vehicular, etc.

When a positive response is generated by a P/EMS cruiser, i.e., definite intent to respond to the exigency an acknowledgment of some form, e.g., indicator light is activated in the cab of the vehicle confirming receipt of the request and intent to immediately respond. The organizational dispatcher, Office-In-Charge, etc., would for informational purposes only be apprized of the emergency and that one of the P/EMS vehicle in the fleet is responding to a 767 emergency.

Finally, society more than ever before is experiencing other potentially violent, life threatening vehicular social exigencies that include: car-jackings, kidnapings, personal larceny, etc. These and other unexpected confrontational situations can now be effectively addressed and at the very instant of the intrusion, by using the aforementioned VTV dispatcherless notification GPS/FMS that employs stealth notification technology. The latter capability relies on a hidden or totally inconspicuous VTV manual or voice recognition encoded emergency communication activation switch/system. Activation of the VTV dispatcherless stealth notification GPS/FMS system includes: instantaneous transmission of the exigency—automatically characterized when the stealth system is activated, e.g., numerical code 5, which equates to a hijacking in progress—to the nearest police cruiser(s); that one or possibly more of said police cruiser(s) are in receipt of the appeal for assistance and that at least one of these cruisers intends to immediately proceed to the vehicle in distress. Acknowledgment is conveyed automatically, within seconds, to the vehicle operator by the activation of an LED or other notification device strategically located in the cab of the vehicle and that is only visible or detectable by the vehicle operator. This acknowledgment is simultaneously conveyed to the police organizations dispatcher, Officer-In-Charge or other appropriate individual that needs to be informed for information purposes only.

According to one feature of the invention, the present methodology eliminates the need and attendant critical time delays that are manifest when human dispatchers are involved in the processing and routing or P/EMS cruisers during a vehicular life or property threatening emergency. Accurate and timely routing of the nearest P/EMS cruiser to the scene of a life threatening vehicular accident or theft is accomplished by employing real-time, instantaneous, essentially flawless vehicle accident and theft characterization technology, that is electronically coupled to a modified vehicle-to-vehicle global positioning/fleet management and communication system thereby circumventing the need and attendant time delays that are associated with a human dispatcher.

Another feature of the invention, is the elimination of human dispatchers, attendant critical time delays when involved in the processing and routing P/EMS cruisers to a non-vehicular life or property threatening emergency. Accurate and timely routing of the nearest P/EMS cruiser to the scene of the life threatening non-vehicular accident/theft is accomplished by employing real-time, instantaneous, essentially flawless accident and theft characterization technology, that is electronically coupled to a modified vehicle-to-person or dwelling global positioning/fleet management and communication system thereby circumventing the need for a human dispatcher. The GPS is not required when dealing with fixed locations.

According to another feature of the invention, it employs a new emergency communications number, 767 (SOS) for dispatcherless, time critical, life and property threatening exigencies with characterization codes for accurate notification.

According to another feature the invention provides for direct and time critical interactive communication between the P/EMS cruiser and the automatic P/EMS routing system by acknowledging receipt of the emergency request for assistance, understanding the type or nature of the exigency and intent to respond within a predetermined time interval. Otherwise, the system automatically routes the appeal for emergency assistance to the next nearest P/EMS cruiser that is available.

Another feature of this invention is the accurate and instantaneous routing of an emergency request to the nearest police cruiser(s) to the scene of a life/property threatening vehicular confrontation, e.g., car-jacking, kidnaping, etc. This is accomplished by employing real-time, flawless characterization technology, that uses a hidden or totally inconspicuous VTV manual or voice recognition encoded emergency communication activation switch/system to permit stealth communications by the person needing assistance. Acknowledgment is conveyed automatically, within seconds, to the vehicle operator by the activation of an LED strategically located in the cab of the vehicle and that is only visible to the vehicle operator. This acknowledgment is simultaneously conveyed to the organizational dispatcher for informational purposes. The entire system is electronically coupled to a modified vehicle-to-vehicle global positioning/fleet management and communication system thereby circumventing the need for the direct involvement of an organizational dispatcher to avoid time delays.

DETAILED DESCRIPTION OF THE PREFERRED EMBODIMENTS

Figure 1:
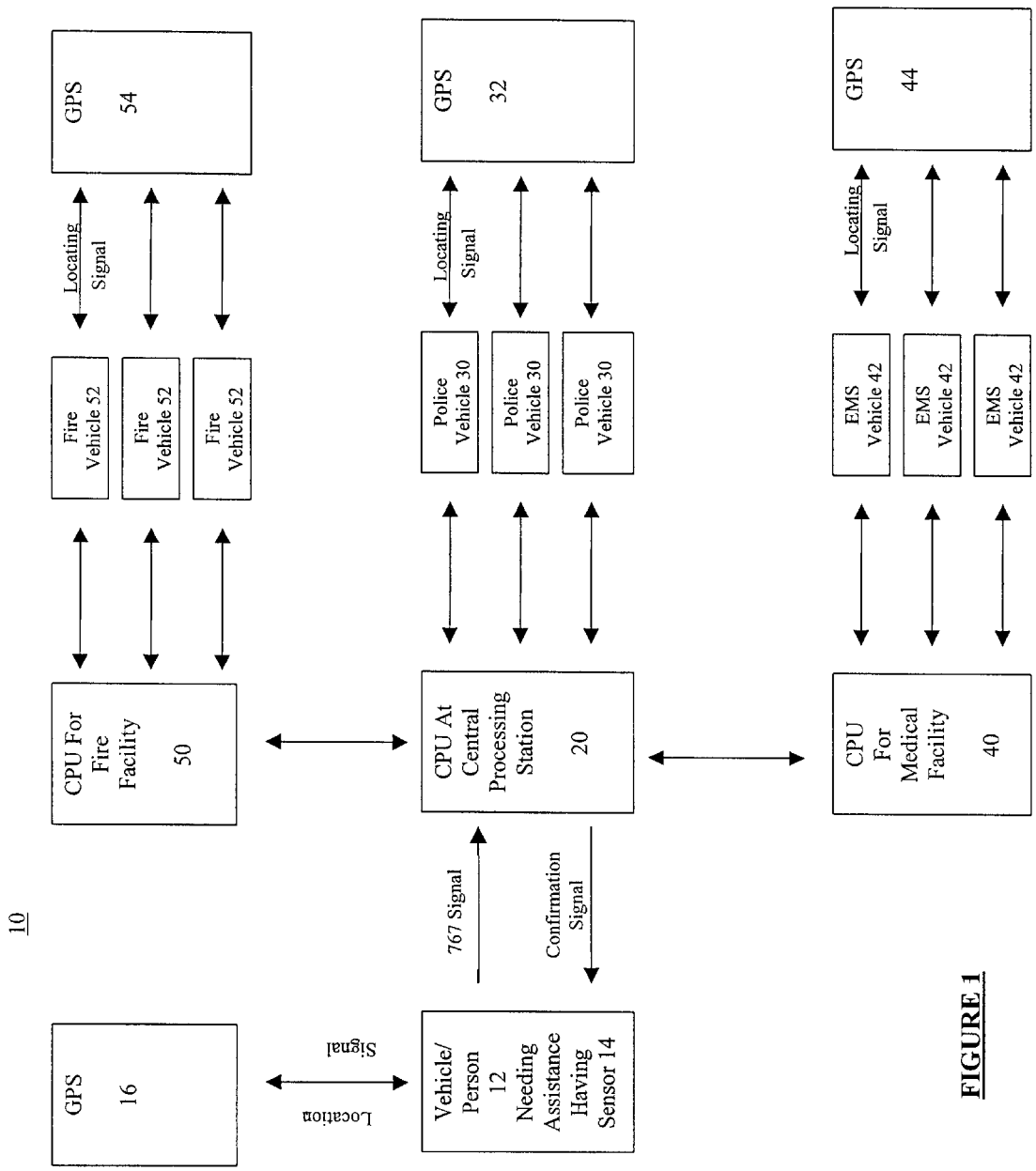
FIG. 1 is a flow diagram of the system network for a vehicular theft, accident, medical emergency or kidnapping.
Figure 2:
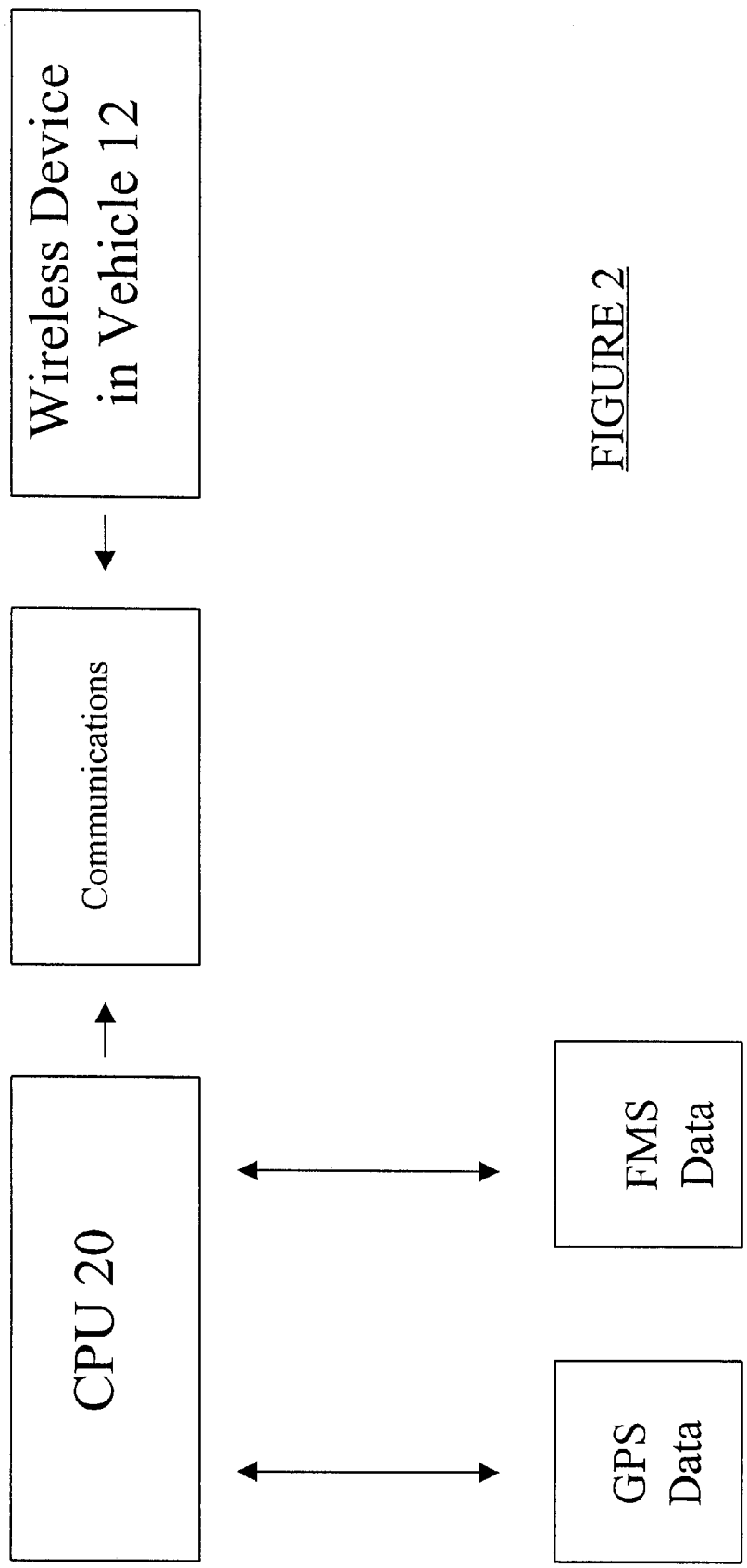
FIG. 2 is a flow diagram of CPU 20.

FIG. 1 is schematic block diagram of the present invention. This instantaneous, automatic, direct (dispatcherless), wireless, vehicle-to-vehicle person-to-vehicle notification system and process is accomplished by employing the following items to communicate an exigency: existing flawless accident sensing and theft motion sensing devices with micro-processing characterization technologies, e.g., linear displacement sensors, accelerometers, ultrasonic sensors, microwave, optical, and laser sensors, vehicle/aircraft (avionics) theft motion sensors having characterization technology as presented in U.S. Pat. No. 5,929,753 that describes a flawless vehicle/aircraft theft deterrence system; a vehicle fleet management system (FMS), e.g., Trimble's Fleetvision 3.0 system currently used in the market place for mobile positioning and communication with real time location capability, and triage sensors that monitor critical human physiological parameters for medical emergencies. Trimble's Fleetvision 3.0 system or other conventional GPS/FMS require a software system upgrade so that they can receive and then direct a bonafide emergency call to the nearest P/EMS cruiser(s) when an automobile, SUV, commercial vehicle, parked aircraft, etc., is in need of time-critical emergency assistance. Automatic and flawless characterization of an exigency, i.e., theft or accident, e.g., air bag deployment, results in a sensor actuating instantaneous and automatic activation of the on board and dedicated wireless telecommunications system. In this manner, i.e., requesting dispatcherless emergency assistance, whether it is from a vehicle or person in need of time-critical assistance, is totally automatic and instantaneous using a dedicated vehicle emergency number, 767 (SOS), instead of the current all purpose emergency number 911.

Conventional GPS/FMS's have cellular/global positioning, two-way paging or cell phones, as well as notification and vehicle tracking capability that rely on wireless communications. Nevertheless, some modifications will have to be made to the existing GPS/FMS to satisfy the novel operational aspects of the technology described herein. A novel software program would be added to the GPS/FMS that would now allow this system to automatically identify and screen 767 incoming digital or even voice recognizable messages. As part of a CPU, central processing unit, or computer, the modified GPS/FMS would analyze the information and confirm the exigency in milliseconds. The CPU then automatically directs the message to the nearest P/EMS cruiser(s) conveying pertinent information from the vehicle or person that is seeking assistance. Again, this would be accomplished automatically and by wireless means from a vehicle or person. For example, if a vehicle accidentally overturns or in another circumstance, is in imminent danger of being violated or stolen, a sensor in the vehicle sends a signal to the communications subsystem of the CPU.

GPS/FMS's as a matter of standard operating procedure constantly monitor the geographical position of all of the vehicles in the systems data base (fleet). As such, the system is capable of instantly identifying and notifying at least one or two, if available, P/EMS cruiser(s) that are in closest proximity to the vehicle in distress or danger. The information conveyed to the P/EMS cruiser(s) would contain critical information about the vehicle or person location, in distress, such as vehicle color, I.D. Number, owner, etc.

The officer/medical team (OMT), by keeping their pager or cell phone line on (open) is automatically recognized by the GPS/FMS as being on duty and available to respond to an emergency call. The OMT operating the cruiser must acknowledge receipt of an incoming 767 message within a predetermined time frame, e.g., within 5 seconds of receipt of the emergency GPS/FMS message. Sending the acknowledgment directly to the CPU having means for processing data from a GPS, FMS and wireless communication devices and not to a dispatcher, is unique to this invention and will save valuable life saving time. Acknowledgment by the OMT is accomplished by depressing a response button that is on a conventional portable two way pager or cell phone, or by activation, whichever is applicable. The OMT would have this as standard equipment. It should be understood that the acknowledgment goes directly to the GPS/FMS and not a dispatcher. Confirmation of the emergency notification by the OMT on duty signifies intent to respond immediately and proceed to the vehicle in distress. Otherwise, the GPS/FMS will automatically route the call to the next closest P/EMS cruiser to respond.

The CPU and GPS/FMS could be located anywhere, but, it would be preferable that it be located at Police Headquarters of a municipality, since it would constantly monitor the exact location of all of the P/EMS vehicles in the emergency response unit (fleet) and in real time. Every P/EMS vehicle in the system would carry a two way pager with an acknowledgment button or voice recognition that interfaces with the CPU for processing of GPS/FMS/wireless communication devices.

OPERATION

FIG. 1 shows the system 10 having a vehicle or person 12 in need of emergency assistance with a sensor 14 and a transmitter which may be in the form of a wireless communication device, such as a cell phone or pager. The location of the vehicle/person 12 is being monitored by GPS 16 and is supplied to the transmitter. GPS 16 may be an inertial guidance system or equivalent. When an emergency occurs, and is sensed by sensor 14, the transmitter sends a wireless emergency signal or a 767 signal to a CPU 20 at a central processing station, such as a police station or other central monitoring station. The emergency signal is coded to identify the type of emergency, such as vehicle accident, vehicle theft, medical emergencies, or person in danger (e.g. larceny, kidnapping, etc.), and also transmits the location data provided by the GPS 16, and identification characteristics of the vehicle 12. The CPU 20 processes the location data from the GPS 16 and uses the FMS to direct the closest vehicle or vehicles to the location of the emergency event.

More specifically, in the case of a vehicle theft or a person in danger, CPU 20 automatically notifies one or more police vehicles 30 to immediately proceed to the location of the emergency event. The police vehicles 30 must notify CPU 20 that they are responding within 5 seconds (or any appropriate interval). If they do not, the CPU 20 notifies the next closest police vehicle 30 to proceed to the location of the emergency event. Once the CPU 20 receives the confirmation signal from the police vehicle(s) 30, the CPU 20 sends a confirmation signal to the vehicle 12 needing assistance that help is on the way. GPS 32 continuously monitors the locations of police vehicles 30 and notifies CPU 20 so that CPU 20 with its FMS capability can process this location data and select the closest vehicles 30 to instantly respond to the location of the emergency event.

In the case of a vehicle accident requiring medical assistance and/or fire assistance, CPU 20 also automatically notifies CPU 40 for the medical facility to immediately dispatch the closest EMS vehicles 42 to the location of the vehicle accident. GPS 44 continuously monitors the locations of EMS vehicles 42 and notifies CPU 40 so that CPU 40 with its FMS capability can process this location data and select the closest EMS vehicle 42 to instantly respond to the location of the emergency event. In the case of a fire, CPU 20 automatically notifies CPU 50 for the fire facility to immediately dispatch the closest fire vehicles 52 to the location of the fire. GPS 54 continuously monitors the locations of fire vehicles 52 and notifies CPU 50 so that CPU 50 with its FMS capability can process this location data and select the closest fire vehicles 54 to instantly respond to the location of the emergency event.

In the case of a person requiring medical assistance or police assistance, who is not in a vehicle, and is located at home, or in an office, or at a shopping location, then the GPS unit 16 may not be needed. In that case, the person 12 in need of assistance and carrying a wireless communication device, sends the emergency 767 signal to CPU 20 which automatically provides his or her address or location as to where they are located. As described above, the appropriate vehicles 30, 42 and/or 52 are notified to respond.

The sensors 14 are of the following types depending on the emergency event. When a vehicular accident occurs, an airbag is deployed or other accident sensor 14 in vehicle 12 is activated. The accident sensor 14 activates the transmitter (cell phone line) and it responds to this emergency event by transmitting the emergency signal (767 signal) to CPU 20, as described above.

When a vehicle theft occurs, motion sensor 14 in vehicle 12 is activated. The motion sensor 14 senses a predetermined motion signature pattern which is indicative of a vehicle theft in progress. The motion sensor 14 activates the transmitter and it responds to this emergency event by transmitting the emergency signal (767 signal) to CPU 20, as described above.

When a person driving a vehicle is endangered by a criminal event (e.g. larceny or kidnapping), or has a medical emergency, vehicle sensor 14 in vehicle 12 is activated by the driver. The vehicle sensor 14 activates the transmitter and it responds to this emergency event by transmitting the emergency signal (767 signal) to CPU 20, as described above.

When a person has a medical emergency or is in personal danger (and is not in a vehicle with a vehicle sensor to activate), then he or she may carry an emergency sensor and transmitter and activate it. The emergency transmitter responds to this emergency event by transmitting the emergency signal (767 signal) to CPU 20, as described above.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A dispatcherless communication system for emergency notification of emergency events, comprising:
   a) means for sensing an emergency event;
   b) means for locating said emergency event;
   c) means for transmitting an emergency signal in response to said means for sensing an emergency event and said means for locating said emergency event;
   d) a central processing unit (CPU) for receiving said emergency signal without human intervention;
   e) said CPU being located at a central processing station and having a fleet management system (FMS) for monitoring the location of a plurality of emergency vehicles for providing emergency assistance;
   f) said CPU including means for locating and notifying one or more of said plurality of emergency vehicles closest to said emergency event to provide emergency assistance; and
   g) further including means for locating and notifying the emergency vehicle next closest to said emergency event if said closest vehicle does not respond in a predetermined time period.

2. A dispatcherless communication system in accordance with claim 1, further including means at said central processing station for sending a confirmation signal to said emergency event confirming that an emergency vehicle is responding to said emergency event.

3. A dispatcherless communication system in accordance with claim 1, wherein said means for transmitting said emergency signal includes a wireless communication device preprogrammed for automatically sending said emergency signal.

4. A dispatcherless communication system in accordance with claim 1, wherein said emergency event is a vehicular accident, and said means for sensing includes a vehicle airbag or other accident sensor, and said emergency signal is coded to indicate a vehicular accident, and said central processing station is a police station and a central medical processing station.

5. A dispatcherless communication system in accordance with claim 1, wherein said emergency event is a vehicle theft, and said means for sensing includes a motion sensor for sensing a predetermined displacement signature pattern, and said emergency signal is coded to indicate a vehicle theft, and said central processing station is a police station.

6. A dispatcherless communication system in accordance with claim 1, wherein said emergency event is a criminal event against the driver of a vehicle (larceny or kidnapping), and said means for sensing includes a sensor to be activated by the driver, and said emergency signal is coded to indicate a criminal event against the driver, and said central processing station is a police station.

7. A dispatcherless communication system in accordance with claim 1, wherein said emergency event is a medical emergency, and said means for sensing includes a sensor to be activated by the driver experiencing a medical emergency, and said emergency signal is coded to indicate a medical emergency, and said central processing station is a police station and a central medical processing station.

8. A dispatcherless communication system in accordance with claim 1, wherein said means for locating said emergency event is a GPS (Global Positioning System), or an inertial guidance system.

9. A dispatcherless communication system in accordance with claim 1, wherein said means for transmitting said emergency signal is a wireless communication device.

10. A dispatcherless communication system in accordance with claim 1, wherein said CPU is a computer having means for processing fleet management data, GPS data and data from wireless communication devices.

11. A dispatcherless communication system in accordance with claim 1, wherein said emergency signal is the emergency number 767 (SOS), which is transmitted to said CPU.

12. A dispatcherless communication system for emergency notification of emergency events, comprising:
 a) means for sensing an emergency event;
 b) means for locating said emergency event;
 c) means for transmitting an emergency signal in response to said means for sensing an emergency event and said means for locating said emergency event;
 d) a central processing unit (CPU) for receiving said emergency signal; without human intervention;
 e) said CPU being located at a central processing station and CPU having a fleet management system (FMS) for monitoring the location of a plurality of emergency vehicles for providing emergency assistance;
 f) said CPU including means for locating and notifying one or more of said plurality of emergency vehicles closest to said emergency event to provide emergency assistance; and
 g) said CPU further including means for transmitting said emergency signal from said central processing station to a medical CPU for a central medical processing station or to a fire CPU for a central fire station, said medical CPU and said fire CPU each including means for locating and notifying one or more emergency vehicles closest to said emergency event to provide medical assistance or fire assistance.

13. A dispatcherless communication system in accordance with claim 12, further including means for locating and notifying the emergency vehicle next closest to said emergency event if said closest does not respond in a predetermined time period.

14. A dispatcherless communication system in accordance with claim 12, further including means at said central processing station for sending a confirmation signal to said emergency event confirming that an emergency vehicle is responding to said emergency event.

15. A dispatcherless communication system in accordance with claim 12, wherein said means for transmitting said emergency signal includes a wireless communication device preprogrammed for automatically sending said emergency signal.

16. A dispatcherless communication system in accordance with claim 12, wherein said emergency event is a vehicular accident, and said means for sensing includes a vehicle airbag or other accident sensor, and said emergency signal is coded to indicate a vehicular accident, and said central processing station is a police station and a central medical processing station.

17. A dispatcherless communication system in accordance with claim 12, wherein said emergency event is a vehicle theft, and said means for sensing includes a motion sensor for sensing a predetermined displacement signature pattern, and said emergency signal is coded to indicate a vehicle theft, and said central processing station is a police station.

18. A dispatcherless communication system in accordance with claim 12, wherein said emergency event is a criminal event against the driver of a vehicle (larceny or kidnaping), and said means for sensing includes a sensor to be activated by the driver, and said emergency signal is coded to indicate a criminal event against the driver, and said central processing station is a police station.

19. A dispatcherless communication system in accordance with claim 12, wherein said emergency event is a medical emergency, and said means for sensing includes a sensor to be activated by the driver experiencing a medical emergency, and said emergency signal is coded to indicate a medical emergency, and said central processing station is a police station and a central processing station.

20. A dispatcherless communication system in accordance with claim 12, wherein said means for locating said emergency event is a GPS (Global Positioning System), or an inertial guidance system.

21. A dispatcherless communication system in accordance with claim 12, wherein said means for transmitting said emergency signal is a wireless communication device.

22. A dispatcherless communication system in accordance with claim 12, wherein said CPU is a computer having means for processing fleet management data, GPS data and data from wireless communication devices.

23. A dispatcherless communication system in accordance with claim 12, wherein said emergency signal is the emergency number 767 (SOS), which is transmitted to said CPU.

* * * * *

UNITED STATES PATENT AND TRADEMARK OFFICE
CERTIFICATE OF CORRECTION

PATENT NO. : 6,642,844 B2  Page 1 of 1
APPLICATION NO. : 09/934821
DATED : November 4, 2003
INVENTOR(S) : Albert Montague It is certified that error appears in the above-identified patent and that said Letters Patent is hereby corrected as shown below:

Title Page, Column 1
Below [75] Inventors:
Add: -- [73]  Assignee:  Sivan, LLC., Deal, New Jersey 07723 --

Title Page, Column 2, Abstract, Item (57), line 17, change "closes" to -- closest --.

Column 3, line 48, change "Office-in-Charge" to -- Officer-in-Charge --.

Column 7, line 23, change "vehicle 54" to -- vehicle 52 --.

Drawing Sheet 2 of 2, change "→ " and " ←" to -- ↔ -- and -- ↔ --, all arrowheads are used for both directions.

Signed and Sealed this

Third Day of October, 2006

JON W. DUDAS
*Director of the United States Patent and Trademark Office*